Figure 1:
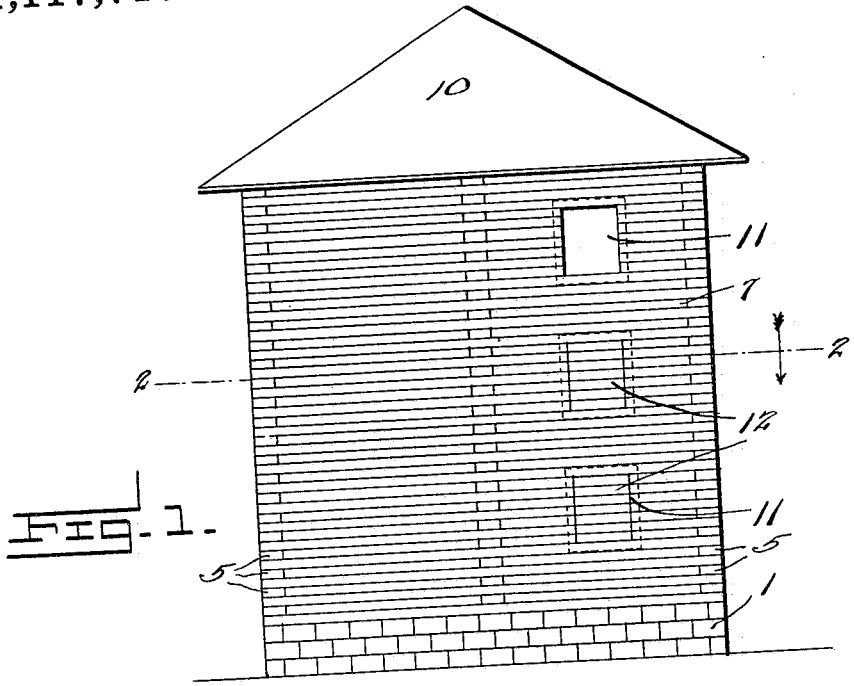

C. M. SPINKS.
SILO.
APPLICATION FILED FEB. 24, 1914.

1,117,717.

Patented Nov. 17, 1914.
2 SHEETS—SHEET 1.

Inventor
C. M. Spinks
by James J. Sheehy
Attorneys

Witnesses
F. F. Armstrong
E. J. Sheehy

THE NORRIS PETERS CO., PHOTO-LITHO., WASHINGTON, D. C.

C. M. SPINKS.
SILO.
APPLICATION FILED FEB. 24, 1914.
1,117,717.
Patented Nov. 17, 1914.
2 SHEETS—SHEET 2.
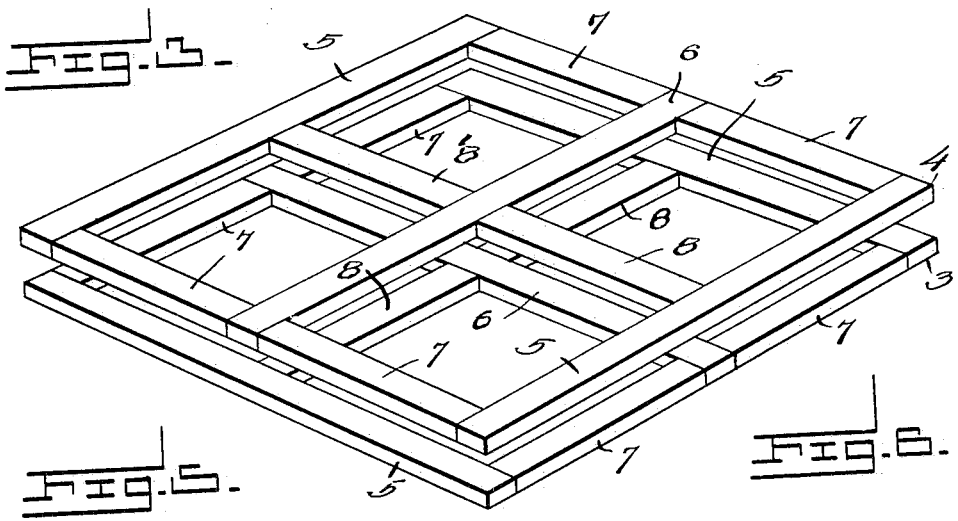
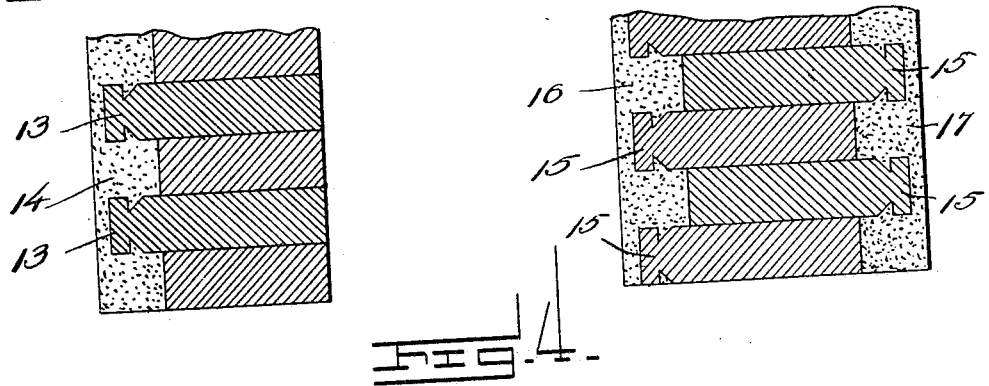
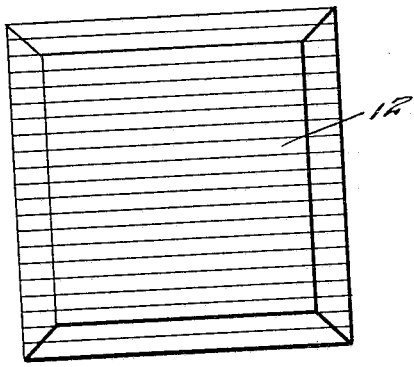
Inventor
C. M. Spinks
by James J. Sheehy & Co.
Attorneys
Witnesses
E. J. Sheehy

UNITED STATES PATENT OFFICE.

CHARLES M. SPINKS, OF MERIDIAN, MISSISSIPPI.

SILO.

1,117,717.

Specification of Letters Patent. Patented Nov. 17, 1914.

Application filed February 24, 1914. Serial No. 820,508.

*To all whom it may concern:*

Be it known that I, CHARLES M. SPINKS, citizen of the United States, residing at Meridian, in the county of Lauderdale and State of Mississippi, have invented new and useful Improvements in Silos, of which the following is a specification.

My present invention pertains to silos. One of the objects of the invention is to provide a silo comprising a plurality of upright, side by side compartments, and door-openings and doors complementary to each compartment and arranged in a vertical series in one wall thereof to permit of ensilage being readily stored in the compartment and as readily removed therefrom as occasion demands. The silo having a multiplicity of compartments each with door-openings and doors of its own is practically advantageous inasmuch as it affords facilities for storing and for the feeding of ensilage throughout a year, there being nothing to prevent the storing of ensilage in one compartment while ensilage is being taken from another for feeding purposes. It is also advantageous because different ensilage may be stored in different compartments, thereby enabling a farmer to utilize anything suitable for ensilage purposes, and also enabling him to segregate special ensilage for horses, cattle, hogs and sheep, respectively.

Another object of the invention is the provision of a silo constructed of superimposed wooden sections in such manner that the silo is rendered stiff and strong, and generally well adapted to withstand expansion and contraction due to change in temperature.

Another object is the provision of a silo constructed of superimposed wooden sections and comprising a group of upright compartments; the sections being so relatively arranged that each compartment is tied to and braced by the other compartments, so that the several compartments constitute a rigid and strong unitary silo.

Another object is the provision of a silo having one or both of its sides, interior and exterior, covered with plastic material; the plastic material being designed to preserve the wood and contribute to the air-tight quality of the silo walls, and being affixed to the walls in a peculiarly strong and durable manner.

Figure 2:
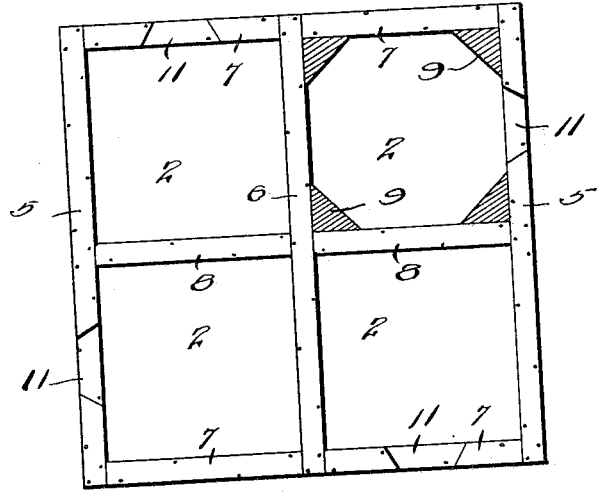

Other advantageous characteristics of the invention will be fully understood from the following description and claims when the same are read in connection with the drawings, accompanying and forming part of this specification, in which:

Figure 1 is an elevation of a silo constituting one embodiment of my invention. Fig. 2 is a horizontal section of the same taken in the plane indicated by the line 2—2 of Fig. 1, looking downwardly. Fig. 3 comprises enlarged disconnected perspectives of alternate layers of the silo body. Fig. 4 is an enlarged elevation showing a type of door that may be embraced in the silo. Fig. 5 is an enlarged detail section illustrative of my advantageous manner of keying plastic material to the outer side of the wall of the silo body. Fig. 6 is a similar view showing plastic material affixed to both the outer and the inner sides of the wall of the silo body.

Similar numerals of reference designate corresponding parts in all of the views of the drawings.

In carrying out my invention, I provide a suitable foundation 1 and arrange upon the same the body of my novel silo. The several compartments 2 in the silo body may and preferably do extend downwardly within the foundation 1, and are there provided with concave or other suitable bottoms, and with walls, of the same material as the foundation, through the medium of which the compartments are separated from each other.

The body of the silo is formed of a plurality of superimposed layers 3 and 4, of wood, and in the practice of my invention these layers may be formed into frames such as shown in Fig. 3 prior to being incorporated in the silo body, or if preferred each layer may be formed incidental to the construction of the silo body—*i. e.*, the wooden sections comprised in each layer may be assembled and properly arranged relative to each other upon the next lower layer. I would also have it understood that the sections of each layer are nailed or otherwise fastened to the sections of the layer below it. Each of the layers referred to comprises two long sections 5 arranged at opposite sides of the silo body, a long section 6 extending the full width of the silo body and arranged intermediate of and parallel to the long sections 5, short sections 7 interposed between the end portions of the long sections 5 and 6, and short sections 8 interposed between the long sections 5 and 6 at the middles thereof. When deemed desirable or necessary, the sections 5, 6, 7 and 8 of each layer are nailed or otherwise connected together. It will also be observed by comparison of Figs. 1 and 3, that the layers 3 and 4 are so arranged relative to each other that the long wooden sections 5 of each layer are arranged above and in alinement with the short sections 7 of the layer below it. By virtue of this relative arrangement, the joints between the sections of wood in each layer are broken by sections of wood in the adjacent layers, with the result that the rigidity and strength of the silo body as a whole are increased, as is also the capacity of the silo body to withstand expansion and contraction.

Manifestly without affecting my invention, the corners of each compartment 2 of the silo may be occupied by upright strips 9, of triangular form in horizontal section. One of the compartments 2 is shown in Fig. 2 as so equipped. The said strips 9 serve to prevent ensilage from collecting in the corners of the compartment, and contribute to the facility with which all of the ensilage stored in a compartment may be removed therefrom. The compartments being adapted to receive ensilage of different descriptions, I would have it understood that the strips 9 may be used in some of the compartments and omitted from the other compartments.

Upon the upper end of the silo body constructed of the layers 3 and 4, is arranged a roof 10 which may be of the conventional or any other suitable construction, and may be secured in position in any approved manner.

Formed in one of the outer walls of each compartment 2 is a vertical series of openings 11, Figs. 1 and 2, for the placing of ensilage in and the removal of ensilage from the compartment. The said openings 11 may be of any suitable shape, and may be controlled by doors of any suitable description. I prefer, however, to bevel the walls of the openings 11, and to close the same, when desired, through the medium of doors 12, beveled as shown in Fig. 4, this doors being advantageous since the beveled doors arranged in the openings with beveled walls will be tightly wedged in position by the pressure of the ensilage, and yet when ensilage in the same horizontal plane as a door is loosened or removed, the door can be readily moved inwardly.

When desired, the inner sides of the several compartments can be lined with cement or any other plastic material suitable to the purpose, as shown in Fig. 5, or if preferred, the inner sides of the compartments and the outer side of the silo body can be covered with cement or other suitable plastic material, as shown in Fig. 6. In the construction shown in Fig. 5, the sections of the alternate layers 3 and 4 are provided with extended heads 13, which are embedded in the plastic material 14, while in the construction shown in Fig. 6, the sections of the alternate layers are provided at opposite sides of the walls with extended heads 15, which are embedded in plastic layers 16 and 17, which cover the wooden body of the silo at the inner and outer sides thereof. By virtue of the said construction, it will be manifest that the plastic layers are strongly connected to the walls of the silo body without the assistance of extraneous means; also, that there is little or no liability of the plastic covering falling or being broken away from the wooden walls.

While I have shown my novel silo as of rectangular form in cross-section, it is obvious that the silo may be of any other shape in cross-section compatible with the purpose of my invention without involving departure from the scope of the invention as claimed.

The silo may gradually be increased in height from season to season, and that when deemed desirable any one or more of the compartments may be discontinued at any distance from the bottom of the silo and the remaining compartments carried up to any desired height.

Having described my invention, what I claim and desire to secure by Letters-Patent is:

1. A silo comprising in a unitary structure superimposed frames of wood arranged horizontally and constructed to form the outer walls of and the partitions between a plurality of upright compartments grouped about a center; each horizontal frame of wood forming part of the outer walls of the compartments and part of the partitions between the compartments and each frame of wood breaking joints with adjacent frames, and the frames being permanently connected together.

2. A silo comprising in a unitary structure superimposed horizontal frames of wood constructed and arranged to each form part of the outer walls and part of the partitions between a plurality of upright compartments grouped about a center; each horizontal frame having two long sections arranged at opposite sides of the silo, a long section extending the full width of the silo and arranged intermediate of and parallel to the first-named long sections, short sections extending between the end portions of the first-named long sections and short sections interposed between the first-named long sections and the second-named long section at the middles thereof, and each frame of wood breaking joints with adjacent frames, and the frames being permanently connected together.

In testimony whereof I have hereunto set my hand in presence of two subscribing witnesses.

CHARLES M. SPINKS.

Witnesses:
MONROE KELTON,
JAMES CAIN.

Copies of this patent may be obtained for five cents each, by addressing the "Commissioner of Patents, Washington, D. C."